(12) United States Patent
Saito

(10) Patent No.: US 7,126,633 B2
(45) Date of Patent: Oct. 24, 2006

(54) SOLID-STATE IMAGE-PICKUP DEVICE HAVING PRIMARY COLOR AND GRAY COLOR FILTERS AND PROCESSING MEANS THEREOF

(75) Inventor: Shinichiro Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 889 days.

(21) Appl. No.: 09/982,304

(22) Filed: Oct. 17, 2001

(65) Prior Publication Data

US 2002/0044209 A1 Apr. 18, 2002

(30) Foreign Application Priority Data

Oct. 18, 2000 (JP) ............................ P2000-318081

(51) Int. Cl.
*H04N 5/335* (2006.01)
*H04N 9/73* (2006.01)

(52) U.S. Cl. ..................... 348/279; 348/273; 348/223.1

(58) Field of Classification Search ........ 348/252–253, 348/272–273, 277, 279, 280; 358/482–483
See application file for complete search history.

(56) References Cited

U.S. PATENT DOCUMENTS

| 5,506,618 | A  | * | 4/1996 | Yoneyama et al. | 348/234 |
| 6,400,403 | B1 | * | 6/2002 | Saito | 348/273 |
| 6,768,511 | B1 | * | 7/2004 | Nakai et al. | 348/229.1 |
| 6,885,398 | B1 | * | 4/2005 | Sladen | 348/273 |
| 6,900,838 | B1 | * | 5/2005 | Fujimura et al. | 348/273 |
| 2004/0105021 | A1 | * | 6/2004 | Hu | 348/272 |

* cited by examiner

*Primary Examiner*—Ngoc Yen Vu
*Assistant Examiner*—Nicholas G. Giles
(74) *Attorney, Agent, or Firm*—Robert J. Depke; Rockey, Depke, Lyons & Kitzinger LLC

(57) ABSTRACT

In a single plate type solid-state image pickup device having a color filter with primary color filters, gray filters are disposed at specific pixels of the arrangement of the primary color filters, whereby variation of the sense of resolution with respect to color can be prevented, and outline emphasis is applied to achieve an excellent image.

8 Claims, 7 Drawing Sheets

FIG. 6

| RED00 GRAY00<br>GREEN00 BLUE00 | RED01 GRAY01<br>GREEN01 BLUE01 | RED02 GRAY02<br>GREEN02 BLUE02 | RED03 GRAY03<br>GREEN03 BLUE03 |
|---|---|---|---|
| RED10 GRAY10<br>GREEN10 BLUE10 | RED11 GRAY11<br>GREEN11 BLUE11 | RED12 GRAY12<br>GREEN12 BLUE12 | RED13 GRAY13<br>GREEN13 BLUE13 |
| RED20 GRAY20<br>GREEN20 BLUE20 | RED21 GRAY21<br>GREEN21 BLUE21 | RED22 GRAY22<br>GREEN22 BLUE22 | RED23 GRAY23<br>GREEN23 BLUE23 |
| RED30 GRAY30<br>GREEN30 BLUE30 | RED31 GRAY31<br>GREEN31 BLUE31 | RED32 GRAY32<br>GREEN32 BLUE32 | RED33 GRAY33<br>GREEN33 BLUE33 |

SOLID-STATE IMAGE-PICKUP DEVICE HAVING PRIMARY COLOR AND GRAY COLOR FILTERS AND PROCESSING MEANS THEREOF

BACKGROUND OF THE INVENTION

1. Field of the Invention

The present invention relates to a single plate type solid-state image pickup device equipped with primary-color type color filters.

2. Description of the Related Art

In a single plate type color solid-state image pickup device, an on-chip color filter, which is designed so that various color filters of plural colors are repetitively disposed in a predetermined arrangement, is formed on a sensor portion to output signals of desired colors.

This on-chip color filter has many kinds of color coding (color arrangements). One of these kinds of color coding has a color arrangement of primary colors (Red, Green, Blue), and it is called as a Bayer arrangement.

The Bayer arrangement is shown in FIG. 11.

If the Bayer arrangement is applied to each four-pixel arrangement (pixel unit) of 2 pixels in the longitudinal direction×2 pixels in the lateral direction, green (G) pixels are obliquely arranged at two places in the diagonal direction, and a red (R) pixel is disposed at one of the other two places while a blue (B) pixel is disposed at the remaining place. As a whole, the arrangement of the pixels is set so that the green pixels are arranged in the oblique direction.

The feature of the Bayer arrangement resides in that when the pixel arrangement is viewed from only the horizontal direction or vertical direction, the green (G) pixels contributing to the resolution exist every pixel. In FIG. 11, Px represents the pixel pitch in the horizontal direction, and Py represents the pixel pitch in the vertical direction.

Accordingly, the Bayer arrangement has the following characteristics.

(1) The spatial frequency characteristic in the horizontal and vertical directions is isotropic.

FIGS. 12A to 12C are spatial frequency characteristics in the horizontal and vertical directions of the three primary colors in the Bayer arrangement of FIG. 11. Specifically, FIG. 12A shows the spatial frequency characteristic for the green G, FIG. 12B shows the spatial frequency characteristic for the red R and FIG. 12C shows the spatial frequency characteristic for the blue B.

From FIGS. 12B and FIG. 12C, each of the red R and the blue B exists every other pixel when the pixels are viewed in each of the horizontal and vertical directions. Accordingly, the horizontal spatial frequency (1/Px) and the vertical spatial frequency (1/Py) are equal to ¼.

On the other hand, from FIG. 12A, the green G exists every pixel when the pixels are viewed in each of the horizontal and vertical directions as described above, and thus the horizontal spatial frequency (1/Px) and the vertical spatial frequency (1/Py) are equal to ½, which is twice as large as these of the red R and the blue B. However, the green G exists every other pixel in the oblique direction, so that the horizontal spatial frequency and the vertical spatial frequency of the green G are equal to those of the red R and the blue B.

Therefore, for the three colors (R, G, B), the horizontal spatial frequency and the vertical spatial frequency are isotropic.

(2) Aperture control signals (outline correcting signals) that provide a comparatively high sense of resolution can be generated by only the green G pixels.

By generating aperture control signals from only the green G pixels, the system can be implemented by using a relatively smaller hardware as compared with a system of generating aperture control signals by using pixels of all three colors.

However, in the color filter having the RGB (primary color type) Bayer arrangement, aperture control signals are generated by using only the signals from the green G pixels, so that the sense of resolution is unbalanced among the colors. When aperture control signals are generated by using only the signals from the green G pixels, the green components dominantly contribute to the spectral characteristic, so that it is difficult to generate aperture control signals from a subject having hue of primary colors (red R, blue B, etc.) containing no green B. That is, for a subject such as a red rose, the outline emphasis is hardly applied to the subject although the subject has high saturation.

SUMMARY OF THE INVENTION

In order to solve the above problem, the present invention has an object to provide a solid-state image pickup device in which the sense of resolution can be prevented from being unbalanced among colors and outline emphasis can be applied to achieve an excellent image.

In order to attain the above object, there is provided a single plate type solid-state image pickup device having a primary-color type color filter having filters of three primary colors, characterized in that gray filters are arranged at specific pixels of the arrangement of the three primary colors.

According to the solid-state image pickup device thus constructed, the gray filters are arranged at the specific pixels of the arrangement of the filters of the three primary colors (red, green, blue), whereby the signals of the respective three primary colors (red, green, blue) can be respectively detected at the specific pixels at which the gray filters are arranged. Therefore, the output signal of each of the three primary colors (red, green, blue) can be processed by using the output signals from the pixels of the gray filters.

BRIEF DESCRIPTION OF THE DRAWINGS

FIGS. 3A and 3B are diagrams showing the green components of the color filter array of FIG. 1, wherein FIG. 3A is a diagram showing the arrangement of the green components, and FIG. 3B is a diagram showing the spatial frequency characteristic of the green components;

FIGS. 4A and 4B are diagrams showing the red components of the color filter array of FIG. 1, wherein FIG. 4A is a diagram showing the arrangement of the red components, and FIG. 4B is a diagram showing the spatial frequency characteristic of the red components;

FIGS. 5A and 5B are diagrams showing the blue components of the color filter array of FIG. 1, wherein FIG. 5A is a diagram showing the arrangement of the blue components, and FIG. 5B is a diagram showing the spatial frequency characteristic of the blue components;

FIG. 6 is a diagram showing the color filter array of FIG. 1 in which addresses are allocated to the respective color filters;

DETAILED DESCRIPTION OF THE PREFERRED EMBODIMENTS

Preferred embodiments according to the present invention will be described hereunder with reference to the accompanying drawings.

The present invention is applied to a single plate type solid-state image pickup device having primary-color type color filters in which gray filters are arranged at specific pixels of the arrangement of the three primary color type filters.

In the solid-state image pickup device of the present invention, the color arrangement of the color filter array is Bayer arrangement, and green filters adjacent to red filters in the horizontal direction or green filters adjacent to blue filter in the horizontal direction are replaced by gray filters.

Further, the solid-state image pickup device of the present invention is equipped with means for ensuring a carrier balance so that the gray filters have the same frequency characteristic as the other three primary color filters, and means of synthesizing an outline correcting signal.

In the present invention, only the specific pixels of the arrangement of primary-color type (red, green, blue) color filters are replaced by the gray filters to construct a color filter array.

Figure 11:
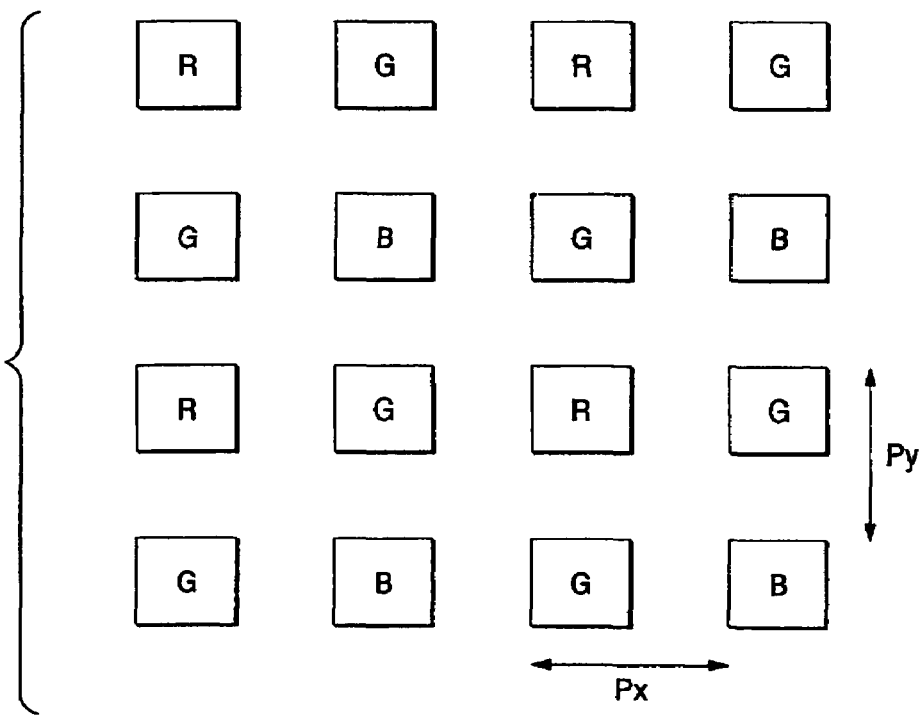
FIG. 11 is a diagram showing Bayer arrangement.

For example, in the case of the color filter array having the primary-color type Bayer arrangement shown in FIG. 11, green G adjacent to red R in the horizontal direction is replaced by gray, or green G adjacent to blue B in the horizontal direction is replaced by gray.

Figure 1:
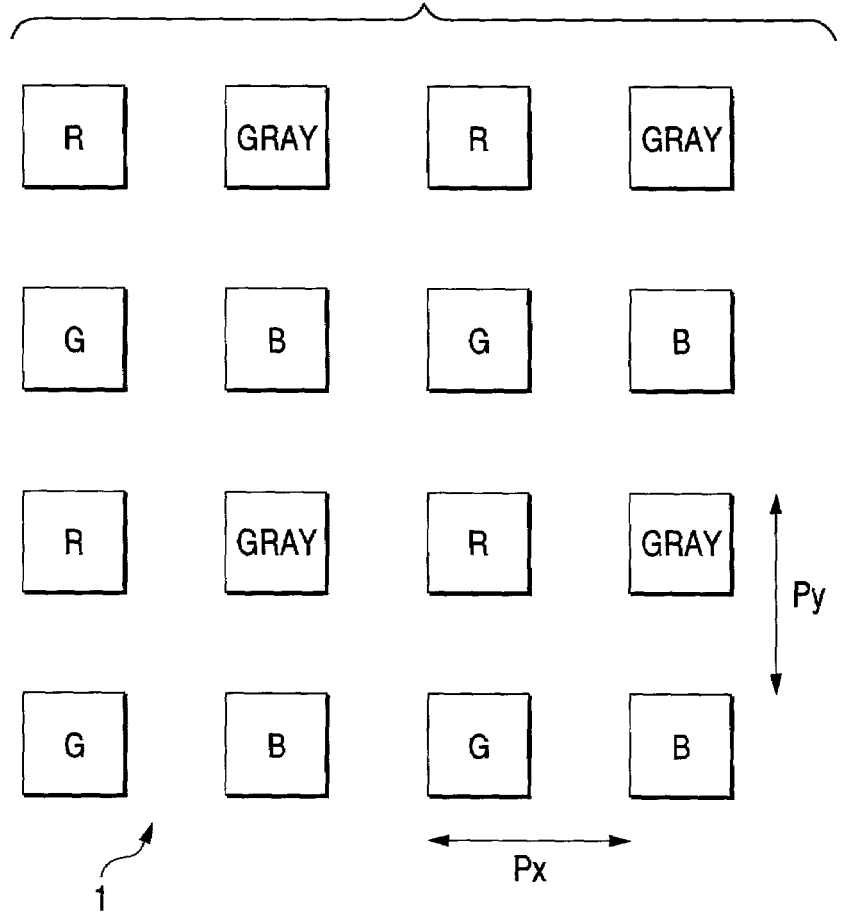
FIG. 1 is a diagram showing the color arrangement of a color filter array of a solid-state image pickup device according to an embodiment of the present invention.

FIG. 1 shows the color arrangement of the color filter array of the solid-state image pickup device according to an embodiment of the present invention.

The color filter array 1 according to the embodiment of the present invention is designed so that the green filters G adjacent to the red filters R in the horizontal direction are replaced by gray filters Gray in the color filter array having the primary-color type Bayer arrangement shown in FIG. 11. Accordingly, each of four color filters of red R, green G, blue B and gray Gray exists every other pixel in both the horizontal and vertical directions.

The gray filters can be formed in the same manner as the other three primary color filters. For example, they can be formed of resist containing gray dye (or pigment) or the like.

The gray filters have a flat spectral characteristic that is relatively a little dependent on the wavelength in a spectroscopic area of visible rays. Like the other color filters, the light transmission characteristic of the gray filters can be changed by varying the content of dye/pigment to increase/decrease the transmissivity of the filters.

The light transmission characteristic of the gray filters can be changed as described above, and it is mainly functionally classified into the following three kinds.

(1) A light transmission characteristic that is near to 100% in transmissivity like ideal white (2) A light transmission characteristic in which the integration value of the transmissivity in the visible region is substantially equal to that of the green filters (3) A transmission characteristic having transmissivity other than described above.

Figure 2:
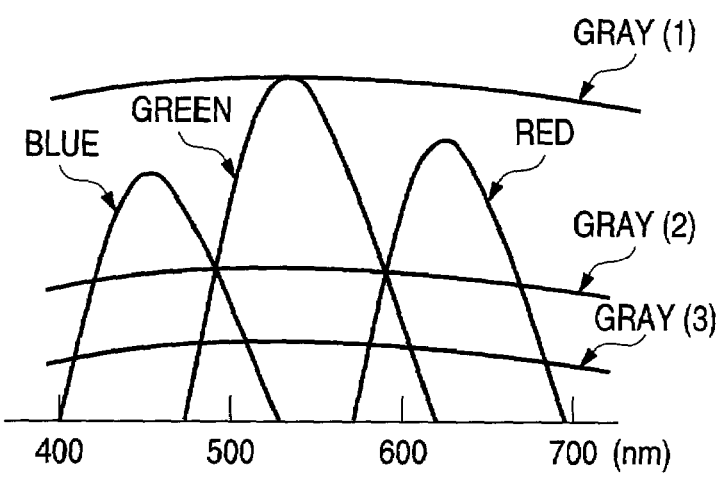
FIG. 2 is a diagram showing the spectral characteristic of each color filter of the color filter array shown in FIG. 1.

FIG. 2 shows the light transmission characteristic of the gray filters together with the transmission characteristics of the other three primary color filters in the above case.

(1) Ideal white characteristic near to 100% in transmissivity (in the case of Gray (1) of FIG. 2)

In this case, the sensitivity of the gray pixels is twice or more as large as the sensitivity of each color of RGB colors, and thus the S/N ration can be improved.

Further, if a carrier balance described later is taken, the output of the gray (Gray) pixels can be set to have the same sensitivity as each RGB color. Accordingly, although a negative gain is achieved, the S/N ratios of the brightness signals and the color difference signals can be improved.

(2) Gray spectroscopy in which the integration value of the transmissivity in the visible region is substantially equal to that of the green filters (in the case of Gray (2) of FIG. 2)

In the case of (1), since the gray filters have higher sensitivity than that of the other RGB filters, the gray filters are more early saturated than the other color filters by the same light amount.

Accordingly, the transmissivity is set so that the integration value in the visible region of the gray filter Gray is substantially equal to that of the green filters G, whereby the dynamic range can be set to the same level as the RGB filter.

(3) Gray spectroscopy having transmissivity other than described above (in the case of Gray (3) of FIG. 2)

The transmissivity is set so that the integration value in the visible region of the gray filter Gray is below that of the green filters G, whereby the dynamic range of the brightness can be set to that of the RGB filters.

However, in this case, the sensitivity of the gray filter Gray is smaller than that of the green filter G, so that the sensitivity or the S/N ratio is smaller than that of the cases (1) and (2).

The gray filter Gray has the flat transmission characteristic as described above, and thus it has responsibility to visible rays of all hues. Accordingly, by controlling the gain so that the signal output from each gray filter Gray has substantially the same sensitivity value as each color pixel of RGB, the output from each gray filter Gray pixel can be used in place of the output signal of each color filter of RGB in the signal processing.

First, the output signals from the green (G) filters will be described.

Figure 3A:
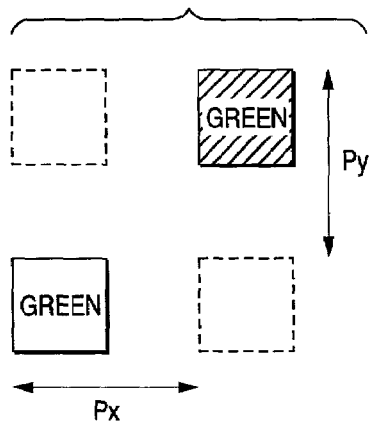

FIG. 3A shows the arrangement of filters serving as green components. In FIG. 3A, a gray filter located at the upper right side as well as an original green filter (Green) located at the lower left side constitutes a green component (Green). In FIG. 3A, in order to discriminate the gray filter from the original green filter, the gray filter is illustrated as being hatched.

Figure 3B:
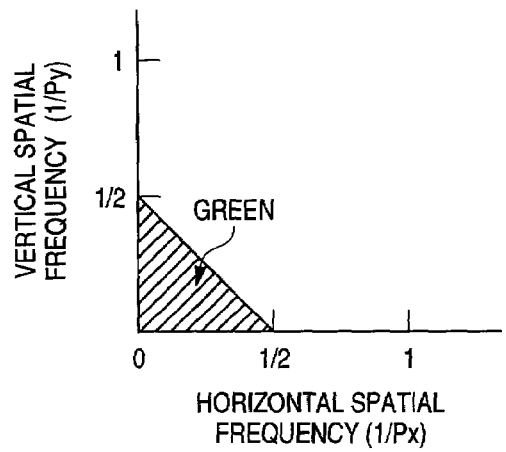
Figure 12A:
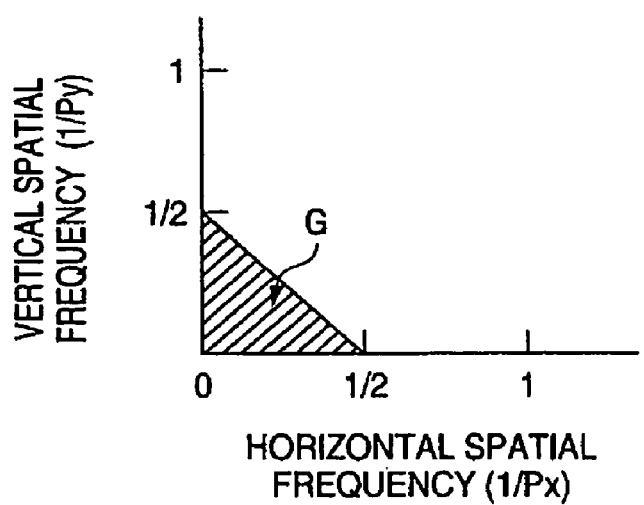
FIGS. 12A to 12C are diagrams showing the spatial frequency characteristics of the respective colors in the Bayer arrangement of FIG. 11.

In this case, the arrangement of the pixels serving as the green components (Green) is the same as the green G of the Bayer arrangement of FIG. 11, and thus as shown in FIG. 3B the spatial frequency characteristic of the green components Green is the same as the case of FIG. 12A described above.

Next, the output signals of the red (R) filters will be described.

Figure 4A:
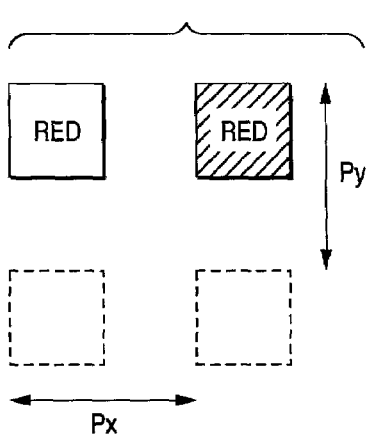

FIG. 4A shows the arrangement of filters serving as red components. In FIG. 4A, a gray filter at the upper right side as well as an original red filter Red at the upper left side constitutes a red component Red. In FIG. 4A, in order to discriminate the gray filter from the original red filter, the gray filter is illustrated as being hatched.

Figure 4B:
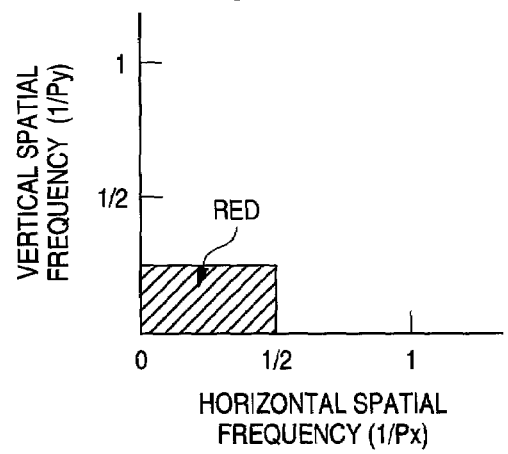
Figure 12B:
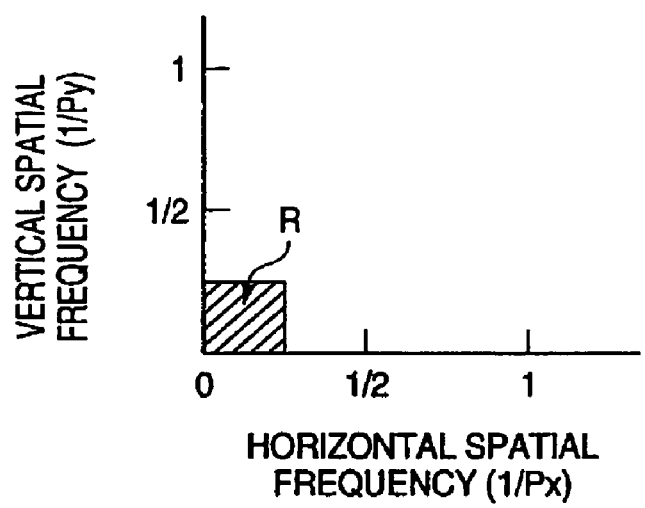

In this case, the pixels serving as the red components Red are located at the upper left side and the upper right side, that is, at the upper half portion. Accordingly, the red components Red exist every pixel in the horizontal direction, and they exist every other pixel in the vertical direction. Accordingly, the spatial frequency characteristic of the red components Red behaves as shown in FIG. 4B, that is, the horizontal spatial frequency is equal to ½ which is twice as large as that of the case of FIG. 12B, and the vertical spatial frequency is equal to ¼ which is the same as the case of FIG. 12B. Further, the number of pixels is twice, so that the area of FIG. 4B is twice as large as the area of FIG. 12B. That is, the information amount of red is twice.

Next, the output signals of the blue (B) filters will be described.

Figure 5A:
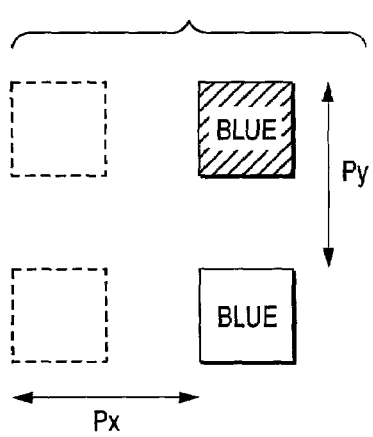

FIG. 5A shows the arrangement of filters serving as blue components. In FIG. 5A, a gray filter located at the upper right side as well as an original blue filter Blue located at the lower right side constitutes a blue component Blue. In FIG. 5A, in order to discriminate the gray filter form the original blue filter, the gray filter is illustrated as being hatched.

Figure 5B:
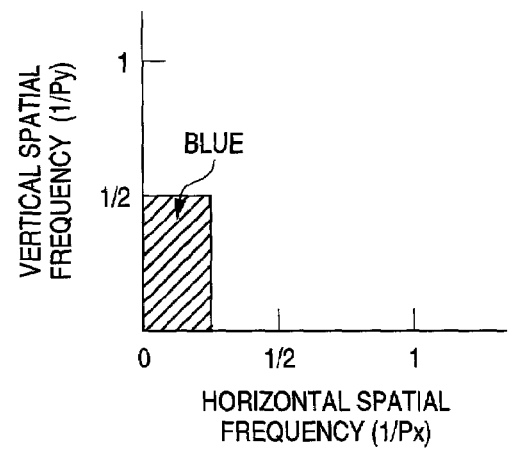
Figure 12C:
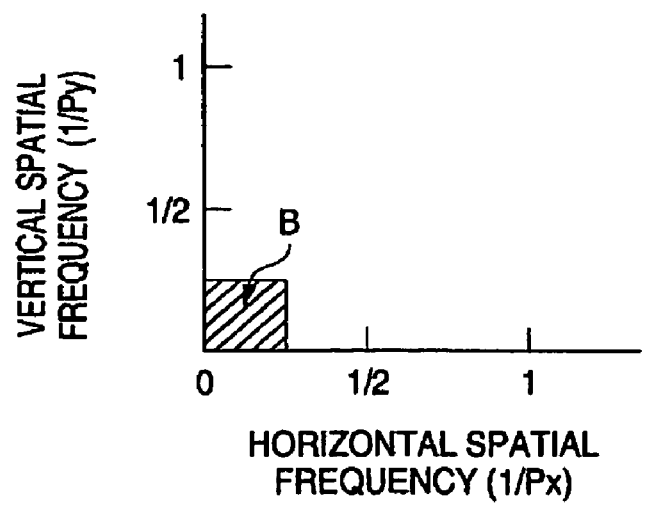

In this case, the pixels serving as the blue components Blue are located at the lower right and upper right sides, that is, at the right half portion. Accordingly, the blue components Blue exist every other pixel in the horizontal direction, and they exist every pixel in the vertical direction. Accordingly, the spatial frequency characteristic of the blue components Blue behaves as shown in FIG. 5B, that is, the spatial frequency is equal to ¼ as in the case of FIG. 12C, and the vertical spatial frequency is equal to ½ which is twice as large as that of the case of FIG. 12C. Further, the number of pixels is twice, and thus the area of FIG. 5B is twice as large as the area of FIG. 12C. That is, the information amount of blue is twice.

That is, in the conventional Bayer arrangement shown in FIG. 11, the pixels of each of red R and blue B have a half information amount of the pixels of green G. However, in this embodiment, the information amount can be handled as being twice as large as the conventional Bayer arrangement by using the gray filters Gray, so that the information amounts of the respective pixels of red R, green G and blue B can be set to be equal to one another.

That is, as the spatial frequency characteristic, the pass bands of red R and blue B are increased to twice of the conventional technique.

Next, a method of generating aperture control signals (outline correcting signal) from filters of four colors (red, green, blue, gray) will be described.

Figure 7:
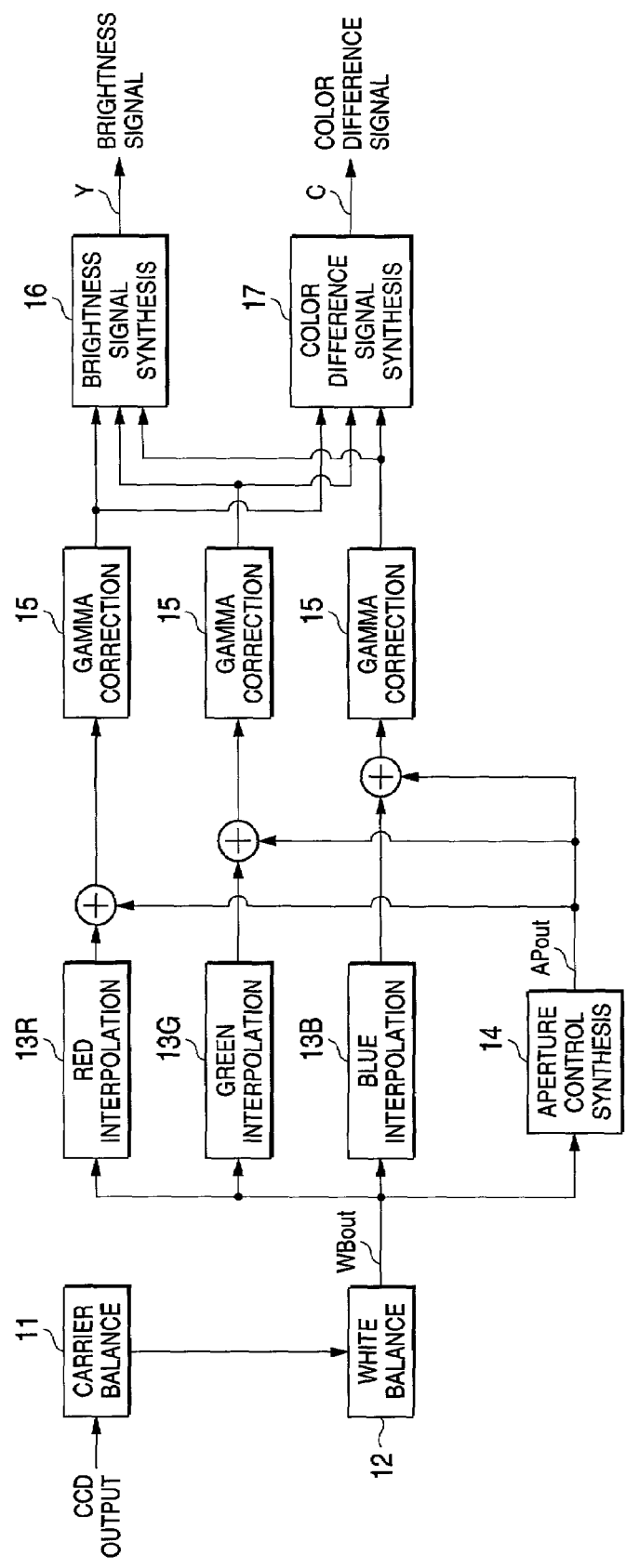
FIG. 7 is a signal processing block diagram.

FIG. 7 is a block diagram showing the signal processing. In the signal processing of FIG. 7, the output signals from the pixels of the four colors (for example, CCD outputs in the case of a CCD type solid-state image pickup device) are subjected to various kinds of processing to achieve brightness signals Y and color difference signals C.

(1) First, it is required to control the respective gains of RGB so that the pixels of the respective gray filters output the same sensitivity values as RGB pixels. This is called as "carrier balance".

Here, it is assumed that all the pixels are sectioned into 4-pixel units each of which comprises 2×2 pixels (4 pixels) of the four color filters and the respective color filters of each 4-pixel (2×2 pixels) unit are represented by Redij, Greenij, Blueij, Grayij (i, j represent addresses based on integers above "0") as shown in FIG. 6.

In this case, the carrier balance is applied to each of green, red and blue on the basis of the following equation:

Green$(i, j)'$=Gray$(i,j)\times[\Sigma$(green output value)$]/[\Sigma$(gray output value)$]$     (Green Carrier Balance)

The range of $\Sigma$ is set to the area of $\pm N$ pixels with respect to a target pixel address (i, j).

Red$(i, j)'$=Gray$(i,j)\times[\Sigma$(red output value)$]/[\Sigma$(gray output value)$]$     (Red Carrier Balance)

The range of $\Sigma$ is set to the area of $\pm N$ pixels with respect to a target pixel address (i, j).

Blue$(i, j)'$=Gray$(i,j)\times[\Sigma$(blue output value)$]/[\Sigma$(gray output value)$]$     (Blue Carrier Balance)

The range of $\Sigma$ is set to the area of $\pm N$ pixels with respect to a target pixel address (i, j).

As described above, the outputs Green(i,j)', Red(i,j)' and Blue(i,j)' that have been subjected to the carrier balance are supplied as respective color output signals to circuits at the subsequent stage.

As shown in FIG. 7, the carrier balance processing is actually carried out in a circuit 11 at the front stage of a white balance circuit 12, which is carried out in a normal signal processing circuit.

(2) Next, the white balance correction processing is carried out after the carrier balance.

For example when an image of a white subject is picked up, it is naturally expected that R, G and B have the same output level. However, they do not necessarily have the same output level because of the difference in spectral characteristics among R, G, B color filters (see FIG. 2). At this time, each of R, G, B is controlled to achieve a gain so that R=G=B when an image of white subject is picked up, whereby the difference in sensitivity to the respective colors is corrected so that a white subject looks white.

This correction is called as "white balance correction", and it is carried out in a normal color filter having no gray filter. In the block diagram of FIG. 7, the white balance correction is carried out in the white balance circuit 12 to achieve output WBout.

(3) Next, three-fold RGB data are produced for all the pixels in order to generate bright signals and color difference signals from the output signals of the respective colors.

This operation is called as "interpolation". That is, the output signals of the four colors are converted from dot-sequential data like R, Gray, R, Gray, . . . , G, B, G, B, . . . to three kinds of RGB data in which RGB exist every pixel like R,R,R,R,R,R, . . . , G,G,G,G,G,G, . . . , B,B,B,B,B,B, . . . Accordingly, 300 data pieces containing every 100 data pieces of each color (R, G, B) can be achieved from 100 pixels, for example.

In the block diagram of FIG. 7, the interpolation for the respective colors (R, G, B) is carried out on the basis of the output WBout of the white balance circuit 12 in a Red interpolation circuit 13R, a Green interpolation circuit 13G, a Blue interpolation circuit 13B, respectively.

(4) aperture control signals (outline correcting signal) are generated in parallel to the interpolation processing.

Figure 8:
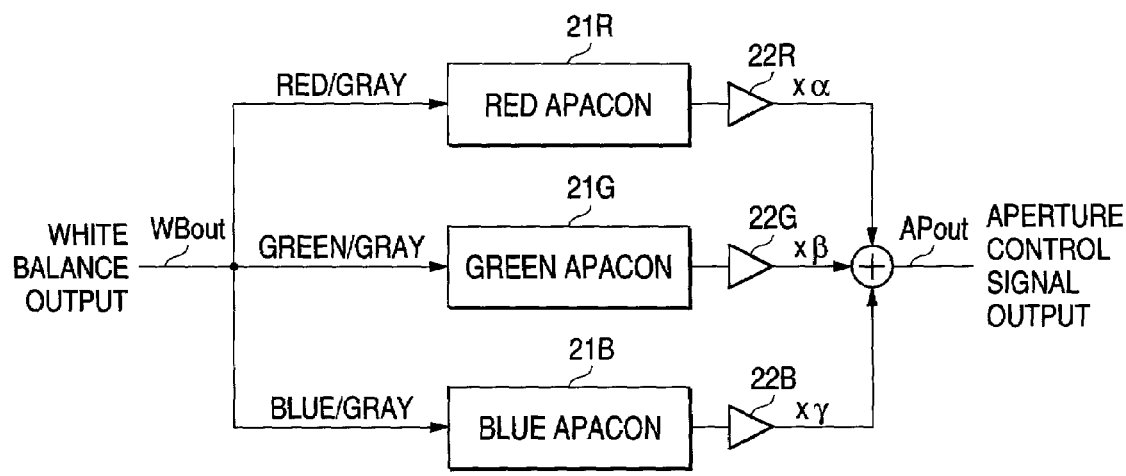
FIG. 8 is a diagram showing the construction of aperture control synthesizing circuit of FIG. 7.

The generation of aperture control signals is carried out in an aperture control synthesizing circuit 14 shown in FIG. 7 after the white balance correction is carried out. FIG. 8 shows the construction of the aperture control synthesizing circuit 14 of FIG. 7.

In the aperture control synthesizing circuit 14, the signal Wbout output from the white balance circuit 12 is first separated into three kinds of signal types of Red/Gray, Green/Gray and Blue/Gray as shown in FIG. 8. This operation is called as "color separation".

After the color separation is carried out, the three kinds of signal types are passed through aperture control circuits 21R, 21G, 21B. Subsequently, the output signals from the aperture control circuits 21R, 21G, 21B are respectively subjected to gain control of gain $\alpha$, gain control of gain $\beta$ and gain control of gain $\gamma$ through amplifiers 22R, 22G, 22B by red, green and blue systems, respectively. Normally, $\alpha=\beta=\gamma=1$. Finally, the signals of these three systems are mixed with one another and then output as aperture control signal output APout.

Figure 9:
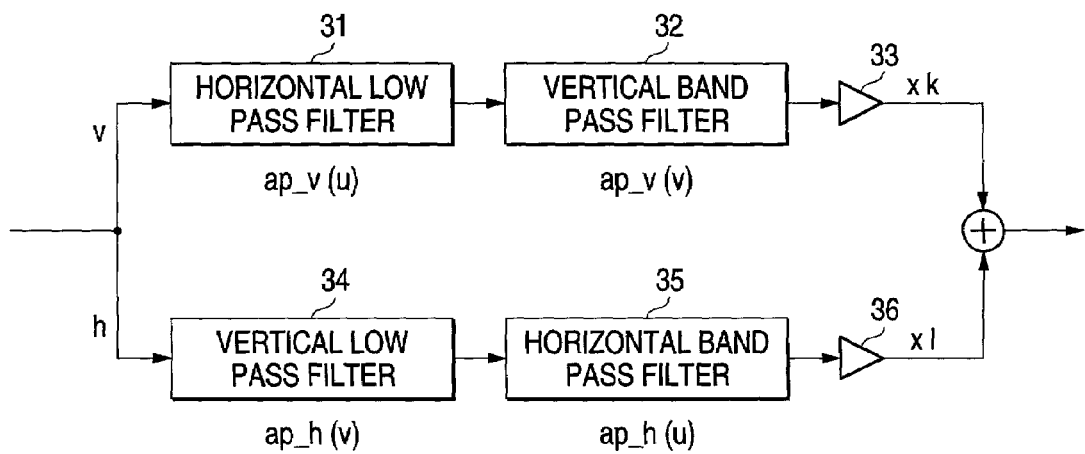
FIG. 9 is a diagram showing the detailed construction of the aperture control synthesizing circuit for each color of FIG. 8.

FIG. 9 shows the detailed construction of the aperture control circuits 21R, 21G, 21B of the respective colors.

The signals after the color separation is carried out are used by two upper and lower systems of FIG. 9. The upper system of FIG. 9 is a system v for generating a vertical aperture control signal ap_v, and the lower system of FIG. 9 is a system h for generating a horizontal aperture control signal ap_h.

The vertical aperture control signal ap_v is first passed through a low pass filter 31 in the horizontal direction, and subjected to an operation ap_v(u) in the horizontal direction to cut high-band signals. Thereafter, an operation ap_v(v) in the vertical direction is carried out by a band pass filter 32 in the vertical direction to generate vertical high-band signals.

The horizontal aperture control signal ap_h is first passed through a low pass filter 34 in the vertical direction and subjected to an operation ap_h(v) in the vertical direction to cut vertical high-band signals. Thereafter, an operation ap_h (u) in the horizontal direction is carried out by a band pass filter 35 in the horizontal direction to generate horizontal high-band signals.

In the operation of each direction, the operation may be carried out by using pixels (several pixels located at the front and rear sides or at the right and left sides) surrounding some specific pixel. Accordingly, for example, the signal of the specific pixel is blurred in the low pass filters 31, 33 and the signal of the specific pixel is emphasized in the band pass filters 32, 34, whereby the signal is set as an origin of the aperture control signal (outline correcting signal).

The gain k is applied to the vertical aperture control signal ap_v by the amplifier 33, and the gain 1 is applied to the horizontal aperture control signal ap_h by the amplifier 36. Thereafter, the signals of the two systems are mixed with each other and output as each RGB aperture control signal. This output is subjected to the gain control in the amplifiers 22R, 22G, 22B of FIG. 8 to compose the aperture control signals of the three colors, thereby achieving the aperture control signal output APout.

(5) Subsequently, the signal that has been subjected to the interpolation processing and the aperture control signal are composed with each other to perform gamma correction.

Here, CRT (Cathode Ray Tube) used for a monitor, a display or the like has a non-linear input/output characteristic, and there is such a tendency that the light emission at the low brightness side is small without being proportional to the input.

Accordingly, when RGB signals are directly displayed on a display device, an image at the low brightness side looks blurred, in other words, it looks dark. This is called as "gamma characteristic of CRT". At this time, by subjecting the input RGB signals to the non-linear processing having the opposite characteristic to the gamma characteristic, the image is brought with natural contrast when the image on a monitor or a display device is viewed. This is called as "gamma correction".

The gamma correction is carried out in a gamma correcting circuit 15 after the interpolated signals in the interpolation circuits 13R, 13G, 13B and the output APout of the aperture control synthesizing circuit 14 are composed with each other.

(6) The signals of the respective colors (R, G, B) after the gamma correction is carried out are transmitted to a brightness signal synthesizing circuit 16 and a color difference signal synthesizing circuit 17. The brightness signal Y is generated in the brightness signal synthesizing circuit 16, and the color difference signal C is generated in the color difference signal synthesizing circuit 17. As described above, the brightness signal Y and the color difference signal C that have been subjected to the outline correction processing can be achieved.

According to the embodiment of the present invention, in the color filter having the primary-color type Bayer arrangement, the specific pixels of the green filters Green are replaced by the gray filters Gray, whereby the pixels of the gray filters Gray have the characteristic that light of all hues can be transmitted therethrough, thereby achieving signals of three colors (R, G, B). Accordingly, the outline emphasis can be applied to even a subject having very small amount of green components, such as a red and blue primary-color type subject. Therefore, the sense of resolution to chromatic color can be improved, and an excellent image can be achieved.

Further, the green filters are replaced by the gray filters having the transmission characteristic that is relatively flat in the visible region, whereby the sensitivity can be improved or the dynamic range can be improved by selecting three kinds of transmissivity of Gray (1), Gray (2) and Gray (3) shown in FIG. 2.

In the above-described embodiment, the present invention is applied to the solid-state image pickup device equipped with the color filter having the Bayer arrangement. However, in the present invention, the color arrangement of the color filter unit is not limited to the Bayer arrangement, but the present invention may be applied to other color arrangements of the primary colors (R, G, B).

Figure 10:
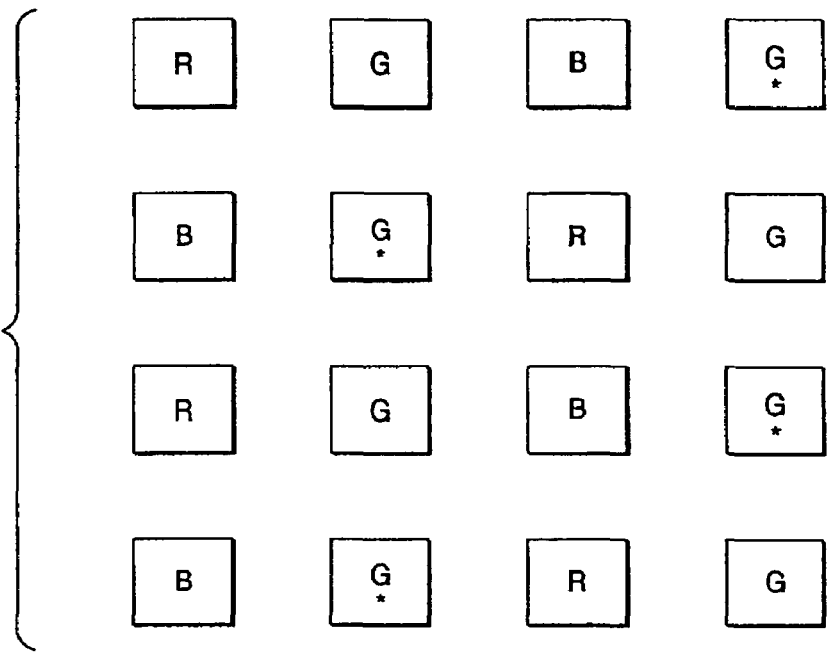
FIG. 10 is a diagram showing another embodiment of the color arrangement of the color filter array to which the present invention is applied.

Another color arrangement to which the present invention is applied is shown in FIG. 10.

FIG. 10 shows a color arrangement called as "G stripe". In this color arrangement, green filters G are aligned in the vertical direction every other column, and red filters R and blue filters B are arranged on each column between the columns of the green filters G. The red filters R and the blue filters B are chequerwise arranged.

When the present invention is applied to this color arrangement, green filters G with asterisks in FIG. 10, that is, the green filters G that are adjacently located at the left side of the red filters R may be replaced by gray filters. Alternatively, the green filters G without asterisks that are adjacently located at the right side of the red filters R may be replaced by gray filters. Accordingly, like the above-described embodiment applied to the Bayer arrangement, the output signals of the three colors R, G, B can be achieved at the pixels of the gray filters, and the variation of the sense of resolution with respect to color can be prevented.

The present invention may be also applied to a CCD type solid-state image pickup device and an MOS type solid-image pickup device. By applying the present invention to any solid-state image pickup device to form an on-chip color filter having gray filters, the sense of resolution can be prevented from being varied with respect to color, and an excellent image can be achieved.

The color filter unit having the gray filters according to the present invention can be used for various types of image display devices (displays), and particularly when the present invention is applied to a solid-state image pickup device, there can be achieved an effect that the sense of resolution can be prevented from being varied with respect to color, and excellent images can be achieved.

The present invention is not limited to the above embodiments, and various modifications may be made without departing from the subject matter of the present invention.

According to the present invention, in the color filter unit of the primary-color type color arrangement, specific pixels are replaced by gray filters, whereby primary color signals can be achieved at the pixels of the gray filters. Accordingly, the sense of resolution can be prevented from being varied in accordance with color, and the outline emphasis can be applied to even a subject of primary colors. Therefore, the resolution for chromatic colors can be improved, and excellent images can be achieved.

Furthermore, according to the present invention, gray filters having a transmission characteristic that is relatively flat in the visible region are provided. Therefore, by selecting the transmissivity of the gray filters, the sensitivity can be improved or the dynamic range can be improved.

What is claimed is:

1. A single plate type solid-state image pickup device having primary-color type color filters, characterized in that gray filters are arranged at specific pixels of the arrangement of the three primary color filters, said image pickup device further comprising means for applying carrier balance so that said gray filters have substantially the same frequency characteristic as the other three primary color filters, wherein the color arrangement of said color filters is Bayer arrangement, and green filters that are adjacent to red filters in the horizontal direction or green filters that are adjacent to blue filters in the horizontal direction are replaced by said gray filters.

2. A single plate type solid-state image pickup device having primary-color type color filters, characterized in that gray filters are arranged at specific pixels of the arrangement of the three primary color filters, said image pickup device further comprising means for applying carrier balance so that said gray filters have substantially the same frequency characteristic as the other three primary color filters, further comprising white balance correction means for correcting the white balance of the signal output from the carrier balance means.

3. The single plate type solid-state image pickup device as claimed in claim 2, further comprising interpolation means for interpolating the signal output from the white balance correction means in order to generate three separate primary color image signals.

4. The single plate type solid-state image pickup device as claimed in claim 3, further comprising aperture control means for generating an aperture control signal for application to each of the three primary color image signals output from the interpolation means.

5. The single plate type solid-state image pickup device as claimed in claim 4, further comprising gamma correction means for correcting the gamma characteristic of each of the three primary color image signals after application of the aperture control signal.

6. A single plate type solid-state image pickup device having primary-color type color filters, characterized in that gray filters are arranged at specific pixels of the arrangement of the three primary color filters, said image pickup device further comprising means for applying carrier balance so that said gray filters have substantially the same frequency characteristic as the other three primary color filters, wherein the color arrangement of said color filters is g-stripe arrangement, and every other green filter in each column of g-stripe arranged green filters are replaced by said gray filters.

7. A single plate type solid-state image pickup device having red, green, blue, and gray color filters, characterized in that the gray filters are arranged at specific pixels of the arrangement of the three primary color filters, and wherein the transmissivity of the gray filter is set so that the integration value in the visible region is substantially equal to that of the green filters.

8. A single plate type solid-state image pickup device having red, green, blue, and gray color filters, characterized in that the gray filters are arranged at specific pixels of the arrangement of the three primary color filters, and wherein the transmissivity of the gray filter is set so that the integration value in the visible region is below that of the green filters.

* * * * *